United States Patent
Hoory et al.

(10) Patent No.: US 8,447,603 B2
(45) Date of Patent: May 21, 2013

(54) RATING SPEECH NATURALNESS OF SPEECH UTTERANCES BASED ON A PLURALITY OF HUMAN TESTERS

(75) Inventors: Ron Hoory, Haifa (IL); Slava Shechtman, Haifa (IL)

(73) Assignee: International Business Machines Corporation, Armonk, NY (US)

(*) Notice: Subject to any disclaimer, the term of this patent is extended or adjusted under 35 U.S.C. 154(b) by 700 days.

(21) Appl. No.: 12/639,011

(22) Filed: Dec. 16, 2009

(65) Prior Publication Data

US 2011/0144990 A1 Jun. 16, 2011

(51) Int. Cl.
*G10L 15/26* (2006.01)
(52) U.S. Cl.
USPC .......................................... 704/235
(58) Field of Classification Search
USPC .......................................... 704/235
See application file for complete search history.

(56) References Cited

U.S. PATENT DOCUMENTS

| | | | |
|---|---|---|---|
| 5,664,050 A | 9/1997 | Lyberg | |
| 5,806,028 A | 9/1998 | Lyberg | |
| 7,024,362 B2 * | 4/2006 | Chu et al. ................. | 704/260 |
| 7,392,187 B2 | 6/2008 | Bejar et al. | |
| 2007/0213982 A1 | 9/2007 | Xi et al. | |

FOREIGN PATENT DOCUMENTS

| | | |
|---|---|---|
| EP | 1139318 | 10/2001 |
| JP | 2002040926 | 2/2002 |
| WO | 9415330 | 7/1994 |
| WO | 9814934 | 4/1998 |

OTHER PUBLICATIONS

Chandel, A. et al, "Sensei: Spoken language assessment for call center agents". IEEE Workshop on Automatic Speech Recognition & Understanding, 2007. Volume , Issue , Dec. 9-13, 2007 pp. 711-716.
ITU-T Recommendation P.862: "Perceptual evaluation of speech quality (PESQ): An objective method for end-to-end speech quality assessment of narrow-band telephone networks and speech codecs".
Jiang-Chun Chen et al, "Automatic Pronunciation Assessment for Mandarin Chinese", 2004, IEEE.
Klaus Zechner et al, "Automatic Scoring of Non-Nativ Spontaneous Speech in Tests of Spoken English", 2009.
Tobias Cincarek, "Automatic Pronunciation Scoring of Words and Sentences Independent From the Non-Native's First Language", 2009.

* cited by examiner

*Primary Examiner* — Susan McFadden

(57) ABSTRACT

A method that includes: generating an utterance-specific scoring model for each one of a plurality of obtained speech utterances, each scoring model usable to estimate a level of speech naturalness for a respective one of the obtained speech utterances; presenting a plurality of human-testers with some of the obtained speech utterances; receiving, for each presented speech utterance, a plurality of human tester generated speech utterances being at least one human repetition of the presented speech utterance; updating the scoring model for each presented speech utterance, based on respective human-tester generated speech utterances; and obtaining a speech naturalness score for each presented speech utterance by respectively applying the updated utterance-specific scoring model to each presented speech utterance.

25 Claims, 4 Drawing Sheets

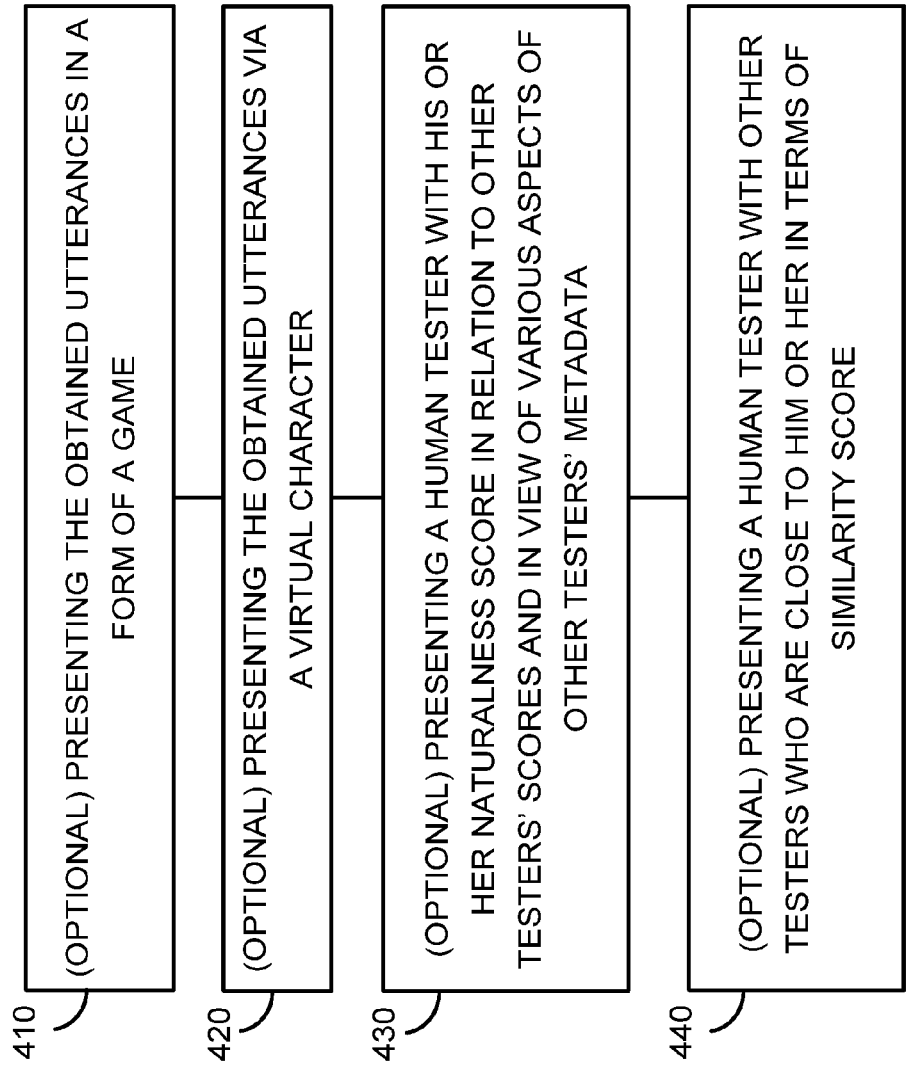

RATING SPEECH NATURALNESS OF SPEECH UTTERANCES BASED ON A PLURALITY OF HUMAN TESTERS

BACKGROUND

1. Technical Field

The present invention relates to the field of speech analysis, and more particularly to rating speech naturalness of speech utterances based on a plurality of human testers.

2. Discussion of the Related Art

Assessing the level of naturalness of speech utterances may be performed by presenting native-speaker volunteers with speech utterances under test and asking them to rate their level of naturalness. Another known way is to generate a comprehensive (e.g., statistic) model for a specified language in a specified accent and then, using a computer, to analyze the utterances under test in view of the comprehensive model to determine their level of naturalness.

Determining the speech naturalness has many uses. For example, it may help improve the development of synthesized speech; it may be used in foreign language studies; and may be used in statistical studies of a specified human population. In particular, it may be useful for evaluating and selecting of candidates for call-center agents, according to how close their accent is to a native speaker accent.

BRIEF SUMMARY

One aspect of the invention provides a method that includes: presenting a plurality of human-testers with some of obtained speech utterances; receiving, for each presented speech utterance, a plurality of human testers generated speech utterances being human repetitions of the presented speech utterance; generating an utterance-specific scoring model for each one of a plurality of the obtained speech utterances, based on respective human-tester generated speech utterances, each scoring model being usable to estimate a level of speech naturalness for a respective one of the obtained speech utterances; and obtaining a speech naturalness score for each presented speech utterance by respectively applying the updated utterance-specific scoring model to each presented speech utterance, wherein at least one of: the presenting, the receiving, the generating, and the obtaining is performed by at least one computer.

Another aspect of the invention provides a server that includes: a feature extraction module; a modeler; a scoring module; and a client-server communication module, wherein the server is in communication with a plurality of client devices that have user interface modules that are each controlled by the client-server communication module, wherein the client-server communication module is configured to: present, via the client devices, a plurality of human-testers with some of the obtained speech utterances, and receive, via the client devices, for each presented speech utterance, a plurality of human testers generated speech utterances being repetitions of the presented speech utterance, wherein the features extraction module is configured to extract speech features from the received speech utterances, wherein the modeler is configured to: generate an utterance-specific scoring model for each one of a plurality of obtained speech utterances, each scoring model being useable to estimate a level of speech naturalness for a respective one of the obtained speech utterances, and update the utterance-specific scoring model based on the speech features extracted from the received speech utterances, and wherein the scoring module is configured to obtain a speech naturalness score for each presented speech utterance, by applying the updated utterance-specific scoring model to each presented speech utterance.

Yet another aspect of the invention provides a computer program product, the computer program product includes: a computer readable storage medium having computer readable program embodied therewith, the computer readable program includes: computer readable program configured to generate an utterance-specific scoring model for each one of a plurality of obtained speech utterances, each scoring model usable to estimate a level of speech naturalness for a respective one of the obtained speech utterances; computer readable program configured to present a plurality of human-testers with some of the obtained speech utterances; computer readable program configured to receive, for each presented speech utterance, a plurality of human testers generated speech utterances being human repetitions of the presented speech utterance; computer readable program configured to update the scoring model for each presented speech utterance, based on respective human-tester generated speech utterances; and computer readable program configured to obtain a speech naturalness score for each presented speech utterance by respectively applying the updated utterance-specific scoring model to each presented speech utterance.

Yet another aspect of the invention provides a system that includes: a feature extraction module; a modeler; a scoring module; and a plurality of network-connected devices each having a user interface and associated with a respective human tester, wherein each device is configured to: present the respective human-tester with obtained speech utterances, and receive, from the respective human-tester, and for each presented speech utterance, a plurality of human testers generated speech utterances being repetitions of the presented speech utterance, wherein the features extraction module is configured to extract speech features from the received speech utterances, wherein the modeler is configured to: generate an utterance-specific scoring model for each one of a plurality of the obtained speech utterances, each scoring model being useable to estimate a level of speech naturalness for a respective one of the obtained speech utterances, and update the utterance-specific scoring model based on the speech features extracted from the received speech utterances, and wherein the scoring module is configured to obtain a speech naturalness score for each presented speech utterance, by applying the updated utterance-specific scoring model to each presented speech utterance.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 4 is a high level flowchart diagram illustrating an aspect of the method according to some embodiments of the invention;

Figure 1:
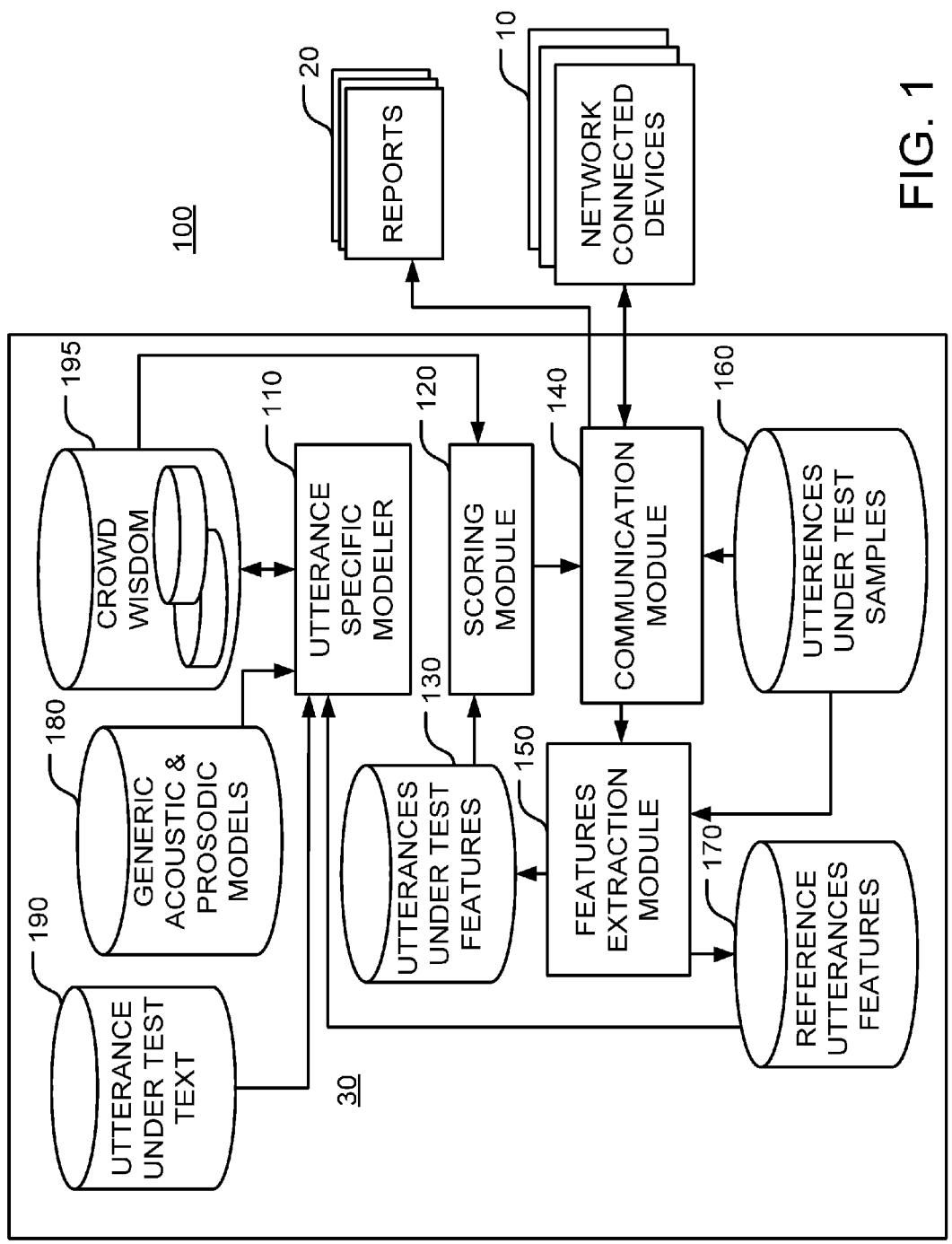
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "speech utterance" as used herein in this application refers to a complete unit of speech in spoken language. It is generally but not always bounded by silence. An utterance may be, for example, a spoken representation of a specified sentence.

The term "wisdom of the crowd" or "crowd wisdom" as used herein in this application, is broadly defined as the process of taking into account the collective opinion of a large group of individuals rather than a single expert to answer a question. A system that uses input that is associated with the wisdom of the crowd needs to meet certain requirements in order to function properly. Such requirements may include some form of incentive presented to individuals in return for their input. An additional requirement is a mechanism for filtering out outlier inputs, provided erroneously or maliciously by some individuals.

The term "scoring model" as used herein in this application, refers either to statistic models such as hidden Markov models (HMM) and Bayesian models, or deterministic models such as fuzzy logic models and rule-based models. The scoring model is referred to as "utterance-specific", when it models a certain speech utterance. These models may be used in a scoring process in which a quality score is produced. The score may be based either on statistical similarity measures or on deterministic distances. The database of crowd wisdom models, used in embodiments of the present invention may contain a set of utterance-specific scoring models The term "acoustic model" as used herein in this application refers to statistical representations of sounds that make up words, for a specific language, spoken by a human speaker or a large population of human speakers.

The term "prosodic model" as used herein in this application refers to statistical representations of speech attributes such as intonation and rhythm for a specific language, spoken by a human speaker or a large population of human speakers.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system 100 according to some embodiments of the invention. System 100 may include: a speech features extraction module 150, an utterance-specific modeler 110, a scoring module 120, and a plurality of network-connected devices 10, each having a user interface and associated with a respective human tester (not shown). Network-connected devices 10 may be personal computers, cellular communication devices, personal device accessories (PDAs) and any device that is network-connected and may further comprise an audio-visual user interface.

System 100 may further include an utterances under test samples database 160, a reference utterances features database 170, an utterances under test features database 160, a crowd wisdom models database 195, a generic speech acoustic and prosodic models database 180, and an utterance under test texts database 190.

Utterance-specific modeler 110 may be coupled to crowd wisdom models database 195, generic speech acoustic and prosodic models database 180, reference utterances features database 170, and utterance under test texts database 190. Communication module 140 may be coupled to utterances under test samples database 160, features extraction module 150, scoring module 120, and network-connected devises 10. Features extraction module 150 may be further coupled to reference utterances features database 170 and utterance under test features database 130. Scoring module 120 may be further coupled to utterance under test features database 130 and crowd wisdom models database 195.

System 100 may be in the form of a computer that includes, in some embodiments, a processor (not shown) and a storage module (not shown). Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

In operation, each network-connected device 10 is configured to present the respective human-tester with obtained speech utterances, and receive, from the respective human-tester, and for each presented speech utterance, one or more human tester generated speech utterances being repetitions of the presented speech utterance. Features extraction module 150 is configured to receive utterances under test samples 160 and output speech features to utterances under test features database 130. Features extraction module 150 is further configured to receive via communication module 140 the repetitions and extract speech features from them and output the features to reference utterance features database 170.

According to some embodiments of the invention, utterance-specific modeler 110 may derive from generic acoustic and prosodic models 180 combined with the text associated with a specified utterance from utterance under test text database 190, the initial utterance-specific scoring models, within crowd wisdom model database 195. Alternatively, modeler 110 may initiate the utterance-specific scoring models in an ad hoc manner in accordance with incoming features from the reference utterance features database 170. Advantageously, such an ad hoc approach allows "bootstrapping" a database of scoring models by using a sufficient amount of the reference utterances.

Utterance-specific modeler 110 may update utterance-specific scoring models within crowd wisdom models database 195, based on the speech features extracted from the respective reference utterances residing in reference utterance features database 170. The aforementioned models may be usable to estimate a level of speech naturalness for a respective one of the obtained speech utterances. In other words, the models according to embodiments of the invention are not global, comprehensive models for a specified language but are generated ad hoc for each utterance under test.

Specifically, the scoring models may be used either alone or combined in order to evaluate at least prosody (e.g. pitch curve, phone durations) and pronunciation (e.g. spectral features) of the respective speech utterance.

According to some embodiments of the invention, modeler 110 may be further configured to filter out at least some of the human tester generated utterances which exhibit speech naturalness score below a specified threshold such that the filtered out tester generated utterances are not used in the updating of the scoring model on crowd wisdom models database 195. In some embodiments, modeler 110 may additionally utilize the generic acoustic and prosodic models 180 and the text associated with a specified utterance from utterance under test text database 190, in order to filter out utterances failing to exhibit a reasonable likelihood score, in accordance to those models.

According to some embodiments of the invention, modeler 110 may be further configured to update the scoring model based on speech features extracted from the received speech utterances such that each extracted feature contributes to the updating of the scoring model in proportion to its cross-similarity among the received speech utterances. Thus, speech features of the utterance that the human testers are more likely to agree upon, may be given more weight when updating the scoring model.

Scoring module 120 may be configured to obtain a speech naturalness score for each presented speech utterance, by applying the updated utterance-specific scoring model obtained from crowd wisdom model database 195 to each presented speech utterance. The scores may be outputted in the form of reports 20, or may also be presented to at least some of the human testers via network-connected devices 10 through communication module 140. This may be performed, for example, as a form of an incentive in return for the input provided by them.

According to some embodiments of the invention, communication module 140 may be further configured to present the obtained speech utterances by either playing it to a human tester, by exhibiting a text that has a respective content of each presented speech utterance, or by a combination of both. Additionally, communication module 140 may be configured to present and to receive over the user interfaces of network-connected device 10 while providing specified incentives to the human testers in return to their repetitions of the respective presented speech utterances The obtained/presented speech utterances (i.e., the speech utterances under test) may be obtained from a repository or a generator (not shown). Therefore, the utterances under test may be either human-generated or synthesized speech. Human tester generated speech utterances (i.e., the reference utterance) are always human generated so that features extracted from them, stored on reference utterance features database 170 may be used to generate and update the utterance-specific models tailored after the utterances under test.

Figure 2:
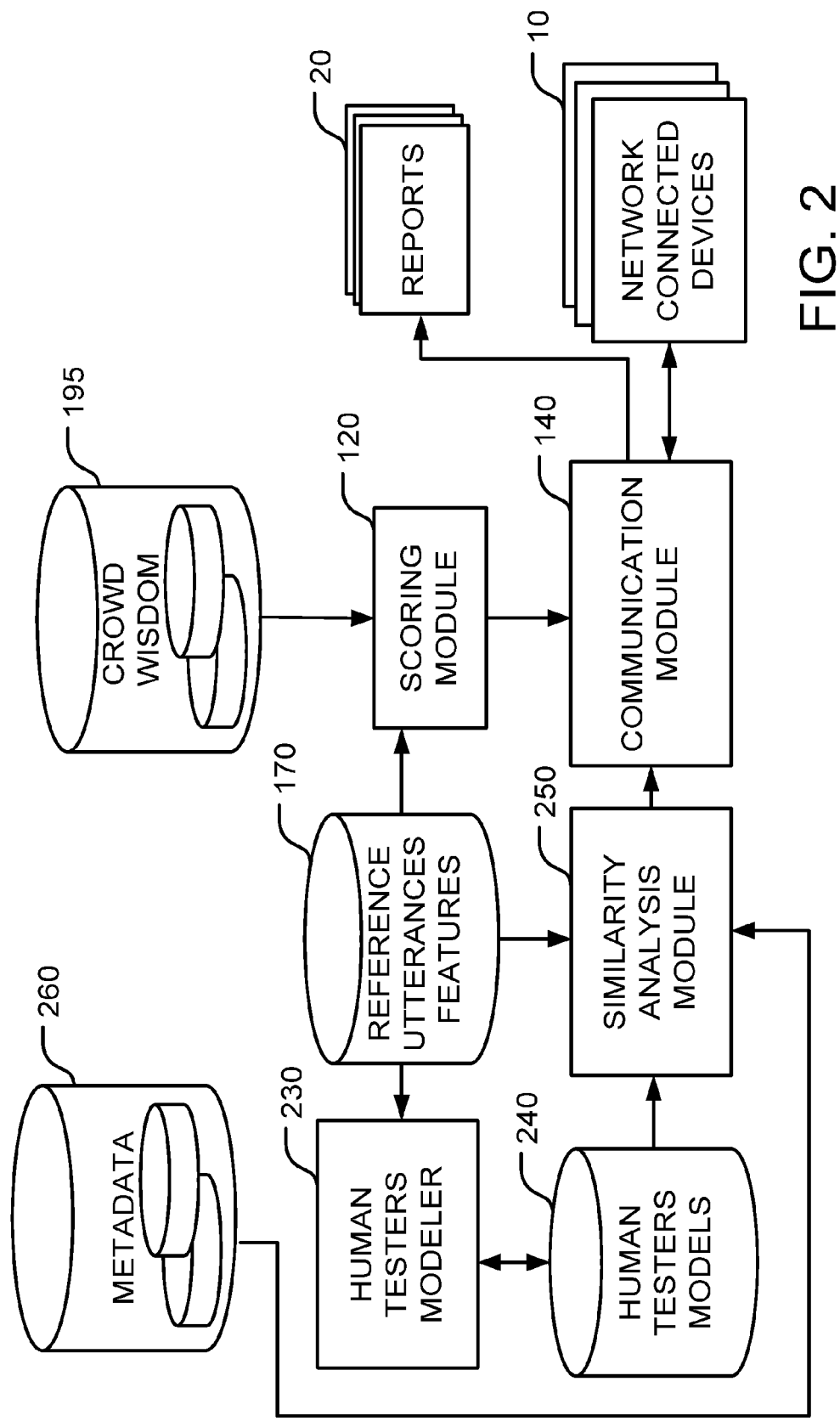
FIG. 2 is a high level schematic block diagram illustrating an aspect of the system according to some embodiments of the invention.

FIG. 2 is a high level schematic block diagram illustrating an aspect of the system according to some embodiments of the invention. Specifically, optional elements of system 100 that are configured to provide incentive to the human testers is illustrated, while other aforementioned elements of system 100 were omitted, for the sake of simplicity.

According to some embodiment of the invention, the presenting and receiving of utterances and repetitions may be in a form of a game or any other environment that present the human testers who participate in the test, with several incentives.

According to some embodiments of the invention, system 100 may further comprise a similarity analysis module 250, a human testers models database 240, a human-testers modeler 230, and a metadata database 260.

In operation, human-testers modeler 230 may be configured to generate human tester specific acoustic and prosodic models stored on human-testers models database 240 usable for measuring acoustic and prosodic distances between different human testers. Similarity analysis module 250 may be configured to use the acoustic and prosodic distances to generate information incentives for the human testers and present them with the similarity data, e.g. to present a human tester with a visualization chart of at least some of the other testers who are close to him/her in terms of the similarity score, preferably, graphically relating the similarity measure to an Euclidian distance at the visualization chart. The visualization may be performed in view of metadata information associated with the human testers (i.e. testers' profiles).

Further examples for incentives may include: a speech naturalness score of a specified human tester, a speech naturalness score of a specified human tester in view of the scores of other human testers and optionally relating to different aspects of testers' metadata (i.e. testers' profiles).

According to some embodiments of the invention, system 100 may be implemented as a server-clients network. Server 30 may include at least one of the aforementioned elements: speech features extraction module 150, utterance-specific modeler 110; scoring module 120, utterances under test samples database 160, reference utterances features database 170, utterances under test features database 170, crowd wisdom model database 195, generic acoustic and prosodic models database 180, and an utterance under test texts database 190. Communication module 140 may be configured as a client-server communication module communicating between server 30 and client devices being network-connected devices 10.

Figure 3:
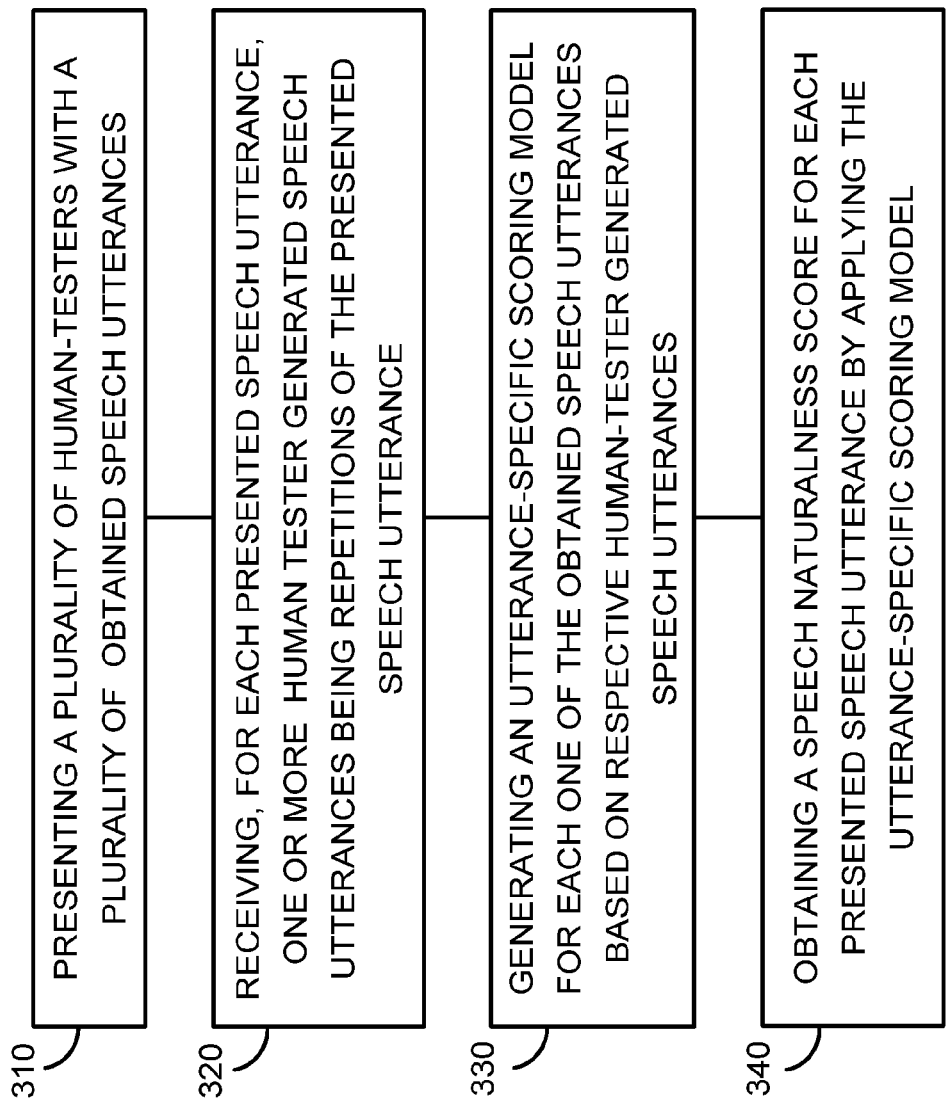
FIG. 3 is a high level flowchart diagram illustrating a method according to some embodiments of the invention.

FIG. 3 is a high level flowchart diagram illustrating a method according to some embodiments of the invention. The method is not necessarily associated with the exemplary architecture of the aforementioned server. The method includes: presenting a plurality of human-testers with some of the obtained speech utterances 310; receiving, for each presented speech utterance, one or more human tester generated speech utterances being human repetitions of the presented speech utterance 320; generating an utterance-specific scoring model for each one of the obtained speech utterances, based on respective human-tester generated speech utterances, each scoring model being usable to estimate a level of speech naturalness for a respective one of the obtained speech utterances 330 and obtaining a speech naturalness score for each presented speech utterance by respectively applying the utterance-specific scoring model to each presented speech utterance 340, wherein at least one of: the generating, the presenting, the receiving, and the obtaining is performed by at least one computer.

FIG. 4 is a high level flowchart diagram illustrating an aspect of the method according to some embodiments of the invention. The aforementioned method may optionally comprise: presenting the obtained utterances in a form of a game 410; presenting the obtained utterances via a virtual character 420; presenting a human tester with their speech naturalness score, in view of other testers' scores and optionally relating to different aspects of testers' metadata (i.e. testers' profiles) 430; and presenting a human tester with other testers who are close to him/her in terms of the similarity score, preferably, presenting graphically, relating the similarity measure to an Euclidian distance at the visualization chart 440. The aforementioned features, either alone or combined provide incentive to the human tester. As explained above, the incentive may advantageously improve the level of correctness of the scoring model used in embodiments of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of evaluating naturalness of speech utterances by using crowd wisdom models, the method comprising:
   presenting a plurality of human-testers with obtained speech utterances;
   receiving, for each presented speech utterance, a plurality of corresponding human-tester generated speech utterances being human repetitions of the presented speech utterance;
   generating, for each presented speech utterance, an utterance-specific scoring model that is based on the corresponding human-tester generated speech utterances, each scoring model being configured to estimate a level of speech naturalness for the presented speech utterance using at least crowd wisdom models; and
   deriving a speech naturalness score for each presented speech utterance by respectively applying the utterance-specific scoring model to each presented speech utterance,
   wherein at least one of: the presenting, the receiving, the generating, and the deriving is executed by at least one computer processor.

2. The method according to claim 1, wherein the generating is based at least on speech features extracted from human tester generated speech utterances, and wherein each extracted feature is usable to update the scoring model in proportion to its cross-similarity among the received speech utterances.

3. The method according to claim 1, further comprising generating human tester-specific acoustic and prosodic models usable for measuring acoustic and prosodic distances between different human testers, and wherein the acoustic and prosodic distances are usable for performing similarity analysis of human testers.

4. The method according to claim 1, wherein the generating comprises filtering out at least some of the human testers-generated utterances which exhibit speech naturalness score below a specified threshold such that the filtered out testers-generated utterances are not used in the updating of the scoring model.

5. The method according to claim 1, wherein, the presenting and the receiving is preformed over a user interface providing specified incentives to the human testers in return to their repetitions of the respective presented speech utterances.

6. The method according to claim 1, wherein, at least one of the presenting and the receiving is performed by a specified virtual character over a user interface.

7. The method according to claim 1, wherein the presenting is performed by at least one of: playing the presented utterance, exhibiting a text that has a respective content of the presented speech utterance, and a simultaneous combination of the playing and the exhibiting.

8. The method according to claim 1, wherein the obtained speech utterances are synthesized speech utterances.

9. The method according to claim 5, wherein at least one of the incentives comprise: a speech naturalness score of a specified human tester, a speech naturalness score of a specified human tester in view of the scores of other human testers, and a similarity mapping of at least some of the human testers based on their relative similarity scores and their similarity score to a specified human tester, wherein the similarity mapping is presented graphically and in view of metadata information associated with the human testers.

10. A server usable for evaluating naturalness of speech utterances by using crowd wisdom models, the server comprising:
a features extraction module;
a modeler;
a scoring module; and
a client-server communication module,
wherein the server is in communication with a plurality of client devices that have user interface modules that are each controlled by the client-server communication module,
wherein the client-server communication module is configured to:
present, via the client devices, a plurality of human-testers with some of the obtained speech utterances, and
receive, via the client devices, for each presented speech utterance, a plurality of corresponding human testers generated speech utterances being repetitions of the presented speech utterance, wherein the features extraction module is configured to extract speech features from speech utterances,
wherein the modeler is configured to:
generate, for each presented speech utterance, an utterance-specific scoring model for each one of a plurality of obtained speech utterances, that is based on respective the corresponding human-tester generated speech utterances, each scoring model being configured to estimate a level of speech naturalness for the presented speech utterances using at least crowd wisdom models, and
update the utterance-specific scoring model based on the speech features extracted from the received speech utterances, and wherein the scoring module is configured to derive a speech naturalness score for each presented speech utterance, by applying the updated utterance-specific scoring model to each presented speech utterance,
wherein at least one of: the features extraction module, the modeler, the scoring module and the client-server communication module is at least partially embodied in hardware.

11. The server according to claim 10, wherein the modeler is configured to update the scoring model based on speech features extracted from the received speech utterances such that each extracted feature contributes to the updating of the scoring model in proportion to its cross-similarity among the received speech utterances.

12. The server according to claim 10, further comprising a testers-modeler;
and a similarity analysis module, wherein the testers-modeler is configured to generate human tester-specific acoustic and prosodic models usable for measuring acoustic and prosodic distances between different human testers, and wherein the similarity analysis module is configured to use the acoustic and prosodic distances to generate information incentives for the human testers.

13. The server according to claim 10, wherein the modeler is further configured to filter out at least some of the human testers-generated utterances which exhibit speech naturalness score below a specified threshold such that the filtered out testers-generated utterances are not used in the updating of the scoring model.

14. The server according to claim 10, wherein, the client-server communication module is configured to present the obtained speech utterances by at least one of: playing the presented utterance, exhibiting a text that has a respective content of the presented speech utterance, and a simultaneous combination of the playing and the exhibiting.

15. The server according to claim 10, wherein the client-server communication module is configured to present and the receive over the user interfaces of the client devices while providing specified incentives to the human testers in return to their repetitions of the respective presented speech utterances.

16. A tangible computer program product for evaluating naturalness of speech utterances by using crowd wisdom models, the tangible computer program product comprising: a non-transitory computer readable storage medium having computer readable program embodied therewith, the computer readable program comprising:
computer readable program configured to present a plurality of human-testers with some of the obtained speech utterances;
computer readable program configured to receive, for each presented speech utterance, a plurality of corresponding human testers generated speech utterances being human repetitions of the presented speech utterance;
computer readable program configured to generate, for each presented speech utterance, an utterance-specific scoring model that is based on the corresponding human-tester generated speech utterances, each scoring model being configured to estimate a level of speech naturalness for the presented speech utterances using at least crowd wisdom models;
computer readable program configured to update the scoring model for each presented speech utterance, based on respective human-tester generated speech utterances; and
computer readable program configured to derive a speech naturalness score for each presented speech utterance by respectively applying the updated utterance-specific scoring model to each presented speech utterance.

17. The tangible computer program product according to claim 16, wherein the update of the scoring model is based on speech features extracted from the received speech utterances, and wherein each extracted feature contributes to the update of the scoring model in proportion to its cross-similarity among the received speech utterances.

18. The tangible computer program product according to claim 16, further comprising computer readable program configured to generate human tester-specific acoustic and prosodic models usable for measuring acoustic and prosodic distances between different human testers, and computer readable program configured to use the acoustic and prosodic distances to generate information incentives for the human testers.

19. The tangible computer program product according to claim 16, further comprising computer readable program configured to filter out at least some of the human testers-generated utterances which exhibit speech naturalness score below a specified threshold such that the filtered out testers-generated utterances are not used in the update of the scoring model.

20. The tangible computer program product according to claim 16, further comprising computer readable program configured to present the obtained speech utterances and receive the repetitions over a user interface providing specified incentives to the human testers in return to their repetitions of the respective presented speech utterances.

21. The tangible computer program product according to claim 16, further comprising computer readable program configured to present the each obtained speech utterance by at least one of: playing the presented utterance, exhibiting a text that has a respective content of the presented speech utterance, and a simultaneous combination of the playing and the exhibiting.

22. A system for evaluating naturalness of speech utterances by using crowd wisdom models, the system comprising:
   a feature extraction module;
   a modeler;
   a scoring module; and
   a plurality of network-connected devices each having a user interface and associated with a respective human tester,
   wherein each device is configured to:
      present the respective human-tester with obtained speech utterances, and
      receive, from the respective human-testers, and for each presented speech utterance, a plurality of human testers generated speech utterances being repetitions of the presented speech utterance, to yield, for each presented speech utterance, a plurality of corresponding human-tester generated speech;
   wherein the features extraction module is configured to extract speech features from speech utterances,
   wherein the modeler is configured to:
      generate, for each presented speech utterance, an utterance-specific scoring model that is based on the corresponding human-tester generated speech utterances, each scoring model being configured to estimate a level of speech naturalness for the presented speech utterances using at least crowd wisdom models, and
      update the utterance-specific scoring model based on the speech features extracted from the received speech utterances, and wherein the scoring module is configured to derive a speech naturalness score for each presented speech utterance, by applying the updated utterance-specific scoring model to each presented speech utterance.

23. The system according to claim 22, wherein the modeler is configured to update the scoring model based on speech features extracted from the received speech utterances such that each extracted feature contributes to the updating of the scoring model in proportion to its cross-similarity among the received speech utterances.

24. The system according to claim 22, further comprising a testers-modeler;
   and a similarity analysis module, wherein the testers-modeler is configured to generate human tester-specific acoustic and prosodic models usable for measuring acoustic and prosodic distances between different human testers, and wherein the similarity analysis module is configured to use the acoustic and prosodic distances to generate information incentives for the human testers.

25. The system according to claim 22, wherein the modeler is further configured to filter out at least some of the human testers-generated utterances which exhibit speech naturalness score below a specified threshold such that the filtered out testers-generated utterances are not used in the updating of the scoring model.

\* \* \* \* \*